(12) United States Patent
Erickson et al.

(10) Patent No.: US 10,394,963 B2
(45) Date of Patent: *Aug. 27, 2019

(54) NATURAL LANGUAGE PROCESSOR FOR PROVIDING NATURAL LANGUAGE SIGNALS IN A NATURAL LANGUAGE OUTPUT

(71) Applicant: International Business Machines Corporation, Armonk, NY (US)

(72) Inventors: Thomas D. Erickson, Minneapolis, MN (US); Robert G. Farrell, Cornwall, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/965,368

(22) Filed: Dec. 10, 2015

(65) Prior Publication Data

US 2017/0116185 A1    Apr. 27, 2017

Related U.S. Application Data

(63) Continuation of application No. 14/920,131, filed on Oct. 22, 2015.

(51) Int. Cl.
*G06F 17/28* (2006.01)
*G06F 17/27* (2006.01)
*G10L 15/18* (2013.01)

(52) U.S. Cl.
CPC .......... *G06F 17/289* (2013.01); *G06F 17/274* (2013.01); *G06F 17/277* (2013.01); *G06F 17/2809* (2013.01); *G06F 17/2854* (2013.01); *G06F 17/2881* (2013.01); *G10L 15/1807* (2013.01)

(58) Field of Classification Search
CPC .................... G06F 17/30685; G06F 17/2836
USPC ........................................ 704/9, 2
See application file for complete search history.

(56) References Cited

U.S. PATENT DOCUMENTS

| | | | |
|---|---|---|---|
| 7,392,185 B2* | 6/2008 | Bennett | G06F 17/27 704/243 |
| 2008/0046229 A1* | 2/2008 | Maskey | G06F 17/2775 704/2 |
| 2015/0172294 A1* | 6/2015 | Bittner | G06F 21/6245 726/4 |

(Continued)

OTHER PUBLICATIONS

Erickson et al., "Natural Language Processor for Providing Natural Language Signals in a Natural Language Output," U.S. Appl. No. 14/920,131, filed Oct. 22, 2015.

(Continued)

*Primary Examiner* — Jakieda R Jackson
(74) *Attorney, Agent, or Firm* — Cantor Colburn LLP; Rahan Uddin

(57) ABSTRACT

Embodiments are directed to a natural language processing (NLP) system configured to receive a natural language (NL) input and perform an analysis operation to generate a NL output. The NLP system is configured to generate at least one confidence level based at least in part on at least one portion of the analysis operation. The NLP system is further configured to integrate at least one disfluency into the NL output based at least in part on the at least one confidence level.

10 Claims, 9 Drawing Sheets

(56) References Cited

U.S. PATENT DOCUMENTS

2016/0093285 A1* 3/2016 Christian ............... G06F 17/28
704/260

OTHER PUBLICATIONS

List of IBM Patents or Patent Applications Treated as Related; Date Filed: Dec. 10, 2015, pp. 1-2.

* cited by examiner

| LOW CONFIDENCE SIGNAL | HOW TO APPLY TO TOKEN | CONSTRAINTS |
|---|---|---|
| NON-LEXICAL UTTERANCES THAT SIGNAL UNCERTAINTY (e.g., "um", "er", "erm" ...) | INSERT IMMEDIATELY BEFORE TOKEN, PHRASE OR SENTENCE | IF MORE THAN ONE INSTANCE REQUIRED USE MULTIPLE TYPES; TYPES OF TOKENS CAN VARY ACCORDING TO LINGUISTIC REGION |
| A PAUSE | INSERT IMMEDIATELY BEFORE DISFLUENCY | LENGTH OF PAUSE CAN VARY ACCORDING TO LINGUISTIC REGION— TYPICALLY .5 TO 1.5 SECONDS |
| RISING INTONATION | APPLY TO LAST PHONEMES OF DISFLUENCY | CAN ONLY BE APPLIED ONCE PER TOKEN |
| LINGUISTIC HEDGE (e.g., "...I THINK?...", ..."IS THAT RIGHT?...") | APPLY IMMEDIATELY AFTER TOKEN, PHRASE OR SENTENCE | SHOULD ONLY BE APPLIED ONCE PER TOKEN |

FIG. 7

NATURAL LANGUAGE PROCESSOR FOR PROVIDING NATURAL LANGUAGE SIGNALS IN A NATURAL LANGUAGE OUTPUT

DOMESTIC PRIORITY

The present application claims priority to U.S. Non-provisional application Ser. No. 14/920,131 filed on Oct. 22, 2015 titled "NATURAL LANGUAGE PROCESSOR FOR PROVIDING NATURAL LANGUAGE SIGNALS IN A NATURAL LANGUAGE OUTPUT," assigned to the assignee hereof and expressly incorporated by reference herein.

BACKGROUND

The present disclosure relates in general to natural language processing (NLP) systems, specifically NLP systems that include natural language generation (NLG), which include natural language translation (NLT) systems, natural language processing question & answer (NLP Q&A) systems, natural language dialogue systems and the like. More specifically, the present disclosure relates to a NLP system designed to integrate disfluencies with natural language (NL) outputs, wherein the disfluencies are selected and applied in a manner that communicates in natural language a level of confidence in the NL outputs.

NLP is a field of computer science, artificial intelligence, and computational linguistics concerned with the interactions between computers and humans using languages (i.e., natural languages). As such, NLP is related to the area of human computer interaction. Among the challenges in implementing NLP systems is enabling computers to derive meaning from NL inputs, as well as the effective and efficient generation of NL outputs. Included among NLP systems are machine translation (MT) systems and NLP Q&A systems.

MT systems are computer-based tools that support the translation of speech and/or text from one human language to another. MT systems come in a variety of forms, including, for example, fully automated machine translation (FAMT) systems, human-assisted machine translation (HAMT) systems, machine-aided translation (MAT) systems, and the like.

NLT systems are a known type of MT system. NLT systems are computer-based tools that allow two or more individuals in more or less immediate interaction, typically through email or otherwise online, to communicate in different languages. For example, cross-linguistic communication systems allow two or more people who are not fluent in the same language to communicate with one another. Speech recognition and language translation technologies have improved sufficiently that cross linguistic communication can now be automatically supported by technology. As used in the present disclosure, references to a speaker and/or a hearer using a NLT system include scenarios in which the "speaker" produces communications by typing or writing, along with situations in which the "hearer" receives communications by reading text.

NLP Q&A systems answer natural language questions by querying data repositories and applying elements of language processing, information retrieval and machine learning to arrive at a conclusion. Such systems are able to assist humans with certain types of semantic query and search operations It would be beneficial to effectively and efficiently control the manner in which human users experience errors in the NL outputs of NLP systems.

SUMMARY

Embodiments are directed to a NLP system having a memory, a processor system communicatively coupled to the memory, and an input/output module which includes a NL input system and a NL output system which is communicatively coupled to the memory and the processor system. The input/output module is configured to receive a NL input and perform a NL analysis operation on the NL input to generate a NL output. The input/output module is further configured to, based at least in part on at least one portion of the NL analysis operation, generate at least one confidence level. The input/output module is further configured to, based at least in part on the at least one confidence level, integrate a disfluency into the NL output.

Embodiments are further directed to a NLT system having a memory, a processor system communicatively coupled to the memory, a source language input system communicatively coupled to the processor and a target language output system communicatively coupled to the processor. The NLT system is configured to receive a NL input comprising a source human language, and perform a translation operation on the NL input to translate the NL input to a NL output comprising a target human language. Based at least in part on at least one portion of the translation operation, the NLT system generates at least one confidence level signal that represents a degree of confidence in at least one result of the at least one portion of the translation operation. The NLT system is further configured to generate at least one translation control signal based at least in part on the at least one confidence level signal, wherein the at least one translation control signal controls the performance of a disfluency integration operation, and wherein the disfluency integration operation identifies at least one disfluency and integrates the identified at least one disfluency into the NL output.

Embodiments are further directed to a method of performing a NLT, wherein the method includes receiving a NL input comprising a source human language, and performing a translation operation on the NL input to translate the NL input to a NL output comprising a target human language. Based at least in part on at least one portion of the translation operation, generating at least one confidence level signal that represents a degree of confidence in at least one result of the at least one portion of the translation operation. The method further includes generating at least one translation control signal based at least in part on the at least one confidence level signal, wherein the at least one translation control signal controls the processor system to perform a disfluency integration operation. The method further includes identifying at least one disfluency, and integrating the identified at least one disfluency into the NL output.

Embodiments are further directed to a computer program product for performing a natural language translation NLT. The computer program product includes a computer readable storage medium having program instructions embodied therewith, wherein the computer readable storage medium is not a transitory signal per se. The program instructions are readable by a processor system to cause the processor system to perform a method. The method includes receiving a NL input in a source human language, and performing a translation operation on the NL input to translate the NL input to a NL output in a target human language. Based at least in part on at least one portion of the translation operation, the method further includes generating at least one confidence level signal that represents a degree of confidence in at least one result of the at least one portion of the translation operation, and generating at least one translation control signal based at least in part on the at least one confidence level signal, wherein the at least one translation control signal controls the performance of a disfluency integration operation. The method further includes identifying at least one disfluency, and integrating the identified at least one disfluency into the NL output.

Embodiments are further directed to a natural language processing NLP system including a memory, a processor system communicatively coupled to the memory, a question input system communicatively coupled to the processor, and an answer output system communicatively coupled to the processor. The NLP system is configured to receive a NL input comprising a NL question, and perform an analysis operation on data of a corpus to generate a NL answer to the NL question. Based at least in part on at least one portion of the analysis operation, the NLP system is further configured to generate at least one confidence level signal that represents a degree of confidence in at least one result of the at least one portion of the analysis operation. The NLP system is further configured to generate at least one analysis control signal based at least in part on the at least one confidence level signal, wherein the at least one analysis control signal controls the performance of a disfluency integration operation, and wherein the disfluency integration operation identifies at least one disfluency and integrates the identified at least one disfluency into the NL answer.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 7 depicts a table illustrating aspects of one or more embodiments;

Figure 1:
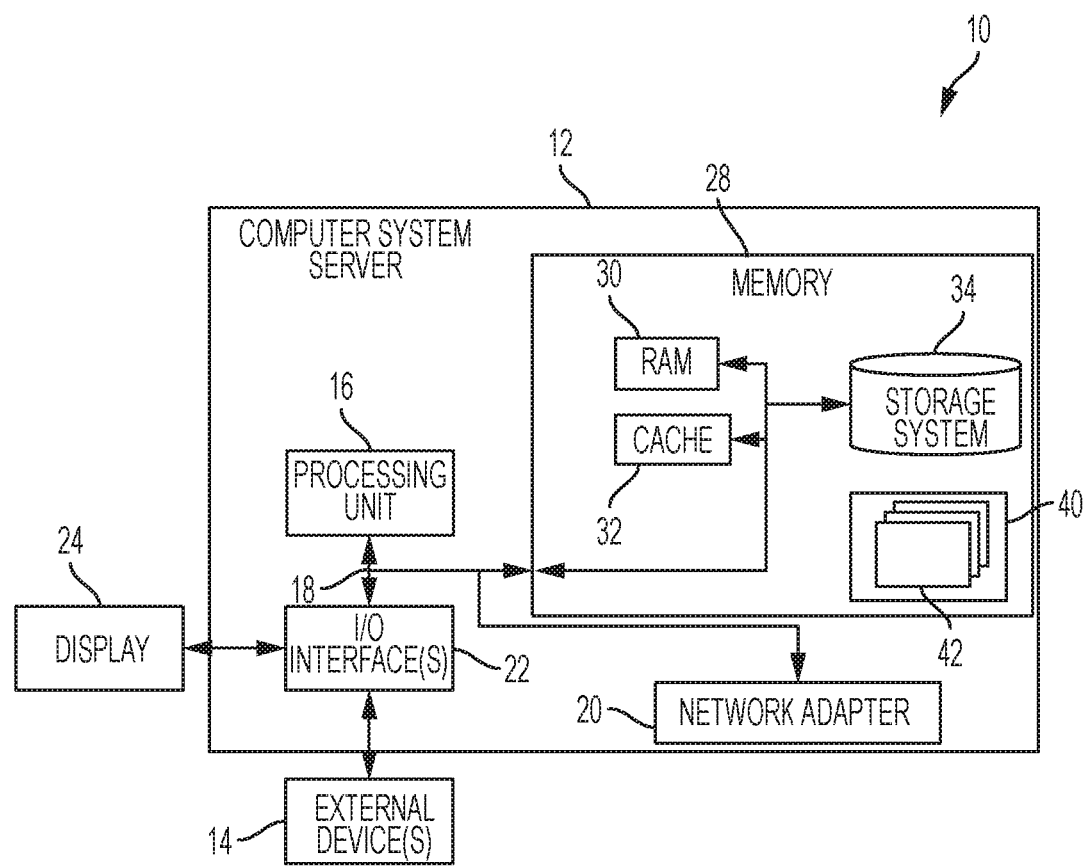
FIG. 1 depicts a cloud computing node according to one or more embodiments.

In the accompanying figures and following detailed description of the disclosed embodiments, the various elements illustrated in the figures are provided with multi-digit reference numbers. The leftmost digit(s) of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

It is further understood that although this disclosure includes a detailed description NLT systems and/or NLP Q&A systems, implementation of the teachings recited herein are not limited to a NLT or NLP Q&A environment. Rather, embodiments of the present disclosure are capable of being implemented in conjunction with any other type of NLP environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
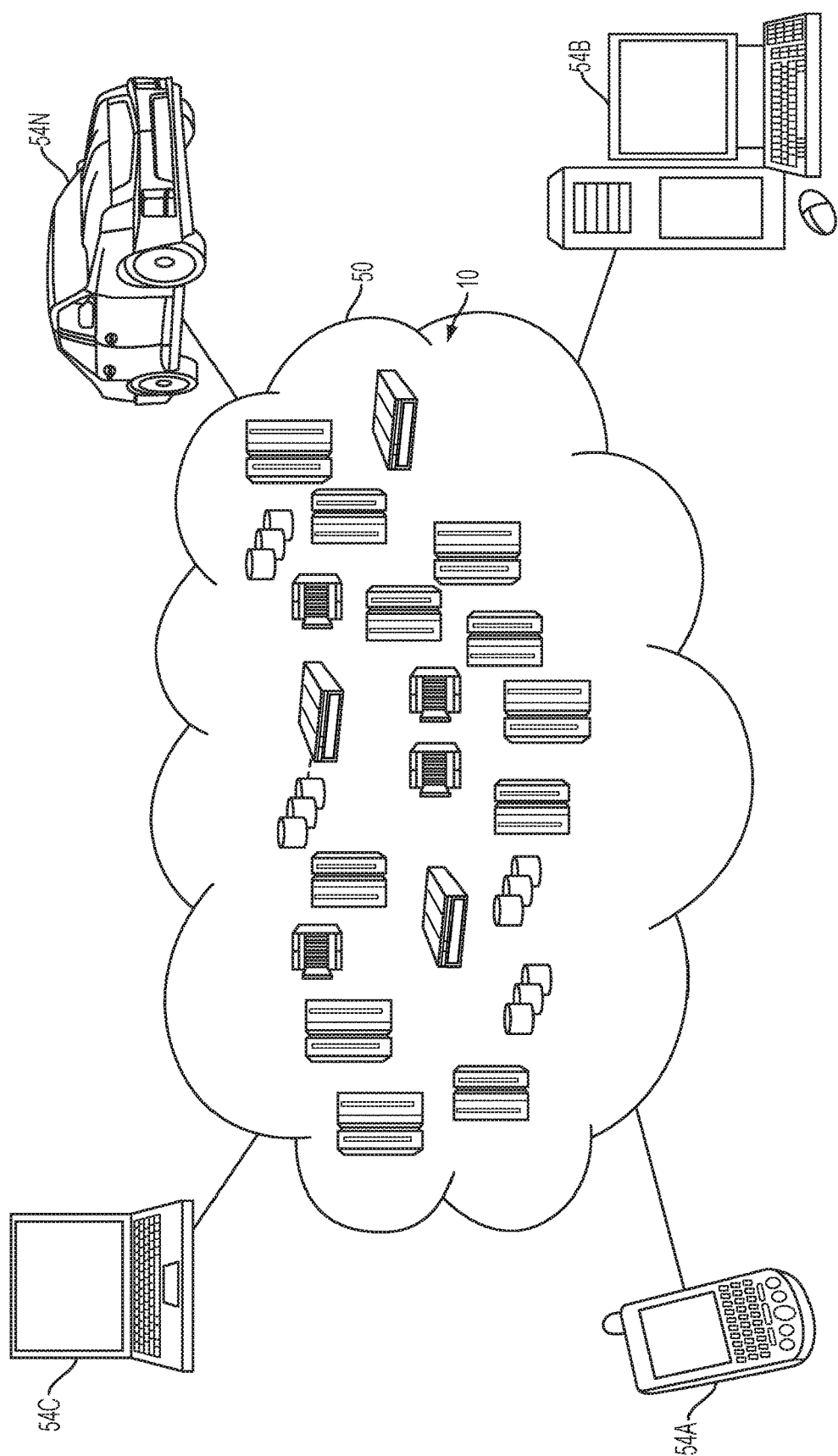
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
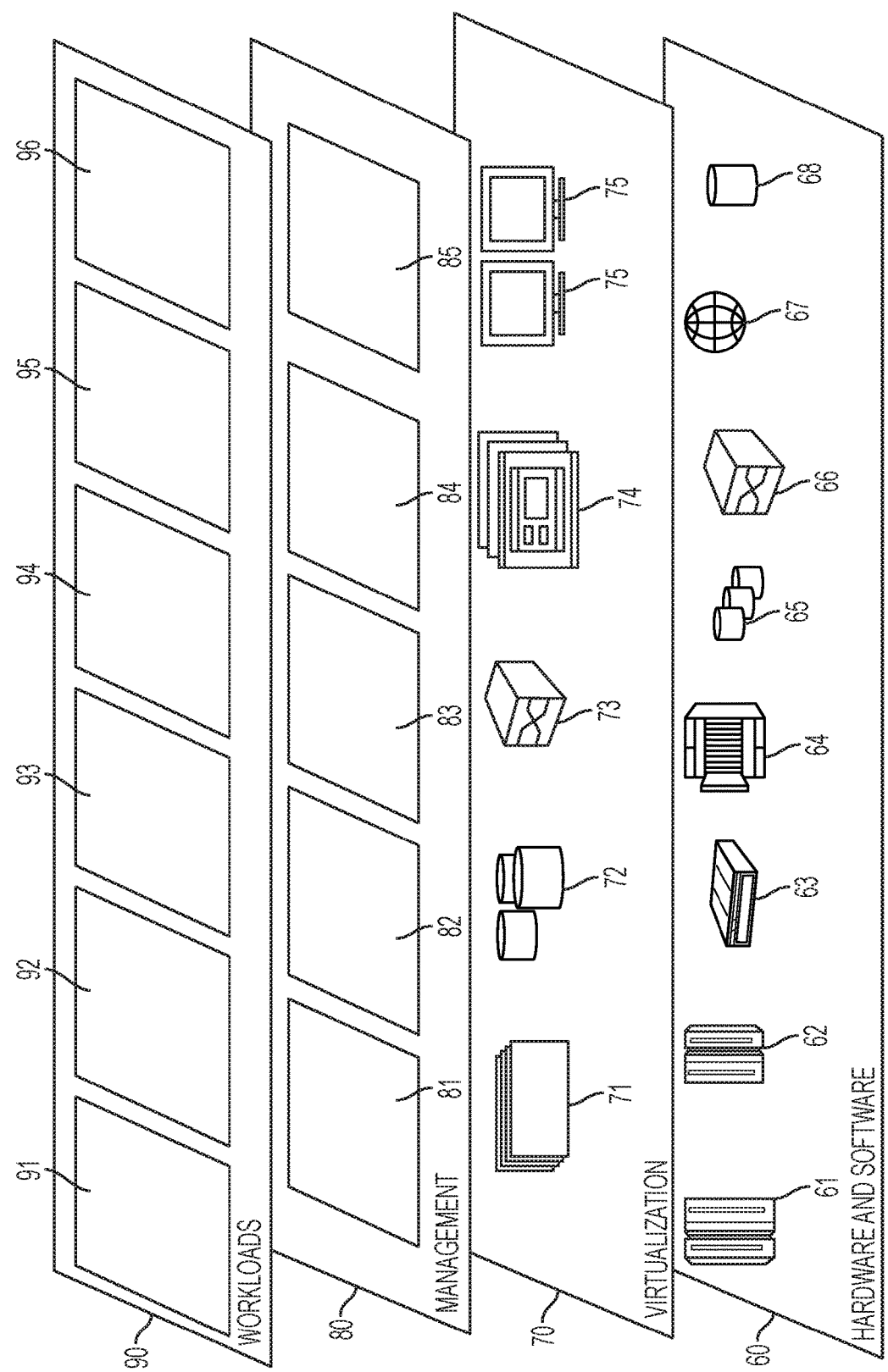
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a NLP module 96.

Communication through natural language, whether embodied in speech or text, is inherently inaccurate. Speakers and writers often struggle to find the correct words and/or phrases to accurately convey their thoughts. The potential for inaccuracy is exacerbated when the communication involves a cross-linguistic translation from a source NL to a target NL. For example, a typical cross-linguistic, NLT system proceeds according to the following repeated pattern. Person "A" generates a phrase in language "X." The phrase may be a single word or a group of words, including full sentences. NLT system receives the phrase generated in language "X" as an input, and then outputs a translated phrase in language "Y." Person "B" takes in the phrase that has been translated into language "Y," understands it, and then generates a reply in language "Y." The NLT system translates the reply into language "X" for person "A." Each stage of the repeated pattern can involve uncertainty as to the choice of words, phrases or sentences that are used to communicate the concept, or in the translation of the chosen words, phrases or sentences.

Natural languages have developed a variety of ways in which difficulty and uncertainty in language production are manifested in speech, including the subtle and inherently imprecise use of variations in prosodic parameters of the speech, as well as the overt and more precise inclusion of disfluencies in speech and/or text. Prosodic parameters are essentially the various vocal patterns and rhythms of speech, including pitch, intonation, nasalization and stress. As used in the present disclosure, disfluencies are lexical utterances or non-lexical vocables that occur within the flow of otherwise fluent speech, but are not a direct component of the intended communication. These include, for example, false starts, i.e., words, phrases or sentences that are cut off mid-utterance, phrases that are restarted or repeated, and repeated syllables, fillers, i.e., grunts or non-lexical utterances such as "huh", "uh", "erm", "um" and "well", and repaired utterances, i.e., instances of speakers correcting their own slips of the tongue or mispronunciations.

The ability of speakers to include in their communications overt and relatively precise NL disfluencies to convey that they have low confidence in, or are uncertain about, whether they have chosen the right words is quite useful. In addition to communicating uncertainty to the hearer, such NL disfluencies also alert the hearer to listen more closely and be alert for errors. Accordingly, natural languages have mechanisms that increase the robustness of written and spoken NL communications in the face of error, and both speakers and hearers are facile at understanding and making use of them.

Turning now to an overview of the present disclosure, one or more embodiments provide a method for detecting uncertainties during natural language processing of NL inputs. Uncertainties in the analysis or translation are naturally communicated to the hearer by integrating disfluent NL text or disfluent NL speech into the NL output. In one or more embodiments, one or more level-of-confidence (LOC) scores are determined for a token produced by a parse of a NL input. The one or more LOC scores may be segmented into multiple LOC ranges that are each selected to represent a particular degree of uncertainty or confidence in the unmodified NL output. For example, LOC scores in a first LOC range can be selected to represent a moderately low level of confidence, LOC scores in a second LOC range can be selected to represent a low level of confidence, and LOC scores in a third LOC range can be selected to represent a very low level of confidence. LOC scores in the first LOC range may be electronically associated (i.e., matched) with NL disfluent speech and text that are generally understood by a reasonable hearer to communicate a moderately low level of confidence. LOC scores in the second LOC range may be electronically associated with NL disfluent speech and text that are generally understood by a reasonable hearer to communicate a low level of confidence. LOC scores in the third LOC range may be electronically associated with NL disfluent speech and text that are generally understood by a reasonable hearer to communicate a very low level of confidence.

In one or more embodiments, the LOC ranges are also electronically associated (i.e., matched) with various disfluency methodologies and disfluency constraints. Each disfluency methodology controls the selection of the NL disfluent speech or text, as well as how the selected NL disfluent speech or text is integrated into the unmodified NL output. Each disfluency constraint prescribes one or more constraints on how the selected NL disfluent speech or text is integrated into the unmodified NL output. Thus, a given LOC score that falls within the first LOC range is electronically associated with disfluent speech and/or disfluent text that are generally understood by a reasonable hearer to communicate a moderately low level of confidence. The LOC score in the first LOC range is also electronically associated with a first disfluency methodology and a first set of one or more disfluency constraints.

As an example, on a scale of 1 to 10, an NLT system in accordance with the present disclosure may be configured to define the first LOC range as LOC scores from 5 to 7, the second LOC range as LOC scores from 2 to 4, and the third LOC ranges as LOC scores below 2. The NLT system performs a NL translation that initially returns a translation of the word for "ferry" in the source language to the word for "ship" in the target language. The NLT system determines a LOC score of 6 for this portion of the translation, which falls in the first LOC range and electronically invokes a first disfluency methodology and a first set of disfluency constraints. The first disfluency methodology selects disfluent speech and/or disfluent text that are electronically associated with the first LOC range, and are generally understood by a reasonable hearer to communicate in the target language a moderately low level of confidence. The first disfluency methodology also provides electronic instructions for how the NLT system should integrate the selected disfluency speech or text into the NLT output. In the present example, the selected disfluent speech/text may be the target language disfluency for "um", and the first disfluent methodology may instruct the NLT system to insert the target language disfluency for "um" immediately before the target language word for "ship." The first disfluency constraint may be that, if more than one disfluency is indicated for the relevant phrase or sentence, select different disfluencies for each instance. In the present example, the first disfluency constraint does not apply. Thus, the NLT system according to the present disclosure integrates the target language disfluency for "um" into the NLT output by placing it immediately before the target language word for "ship." If the complete source sentence reads "I take a ferry to cross the river," and if the NLT system returns a LOC score of 6 for its translation of "ferry" in the source language to "ship" in the target language, the NLT system in accordance with the present disclosure would translate "I take a ferry to cross the river" in the source language to "I take a um ship to cross the river" in the target language.

In one or more embodiments, prosodic parameters of the target language may be added to the integration of disfluent speech or text to augment the disfluency. For example, a pause may be inserted immediately before the disfluency to add emphasis. In the above example, the NLT system in accordance with the present disclosure would translate "I take a ferry to cross the river" in the source language to "I take a . . . um ship to cross the river" in the target language, wherein " . . . " corresponds to a pause in speech.

As another example, on a scale of 1 to 10, an NLP Q&A system in accordance with the present disclosure may be configured to define the first LOC range as LOC scores from 5 to 7, the second LOC range as LOC scores from 2 to 4, and the third LOC ranges as LOC scores below 2. The NLP Q&A system receives a NL input/question "Will the U.S. unemployment rate increase or decrease in the last quarter of 2015," and performs a NLP analysis that returns an initial NL output/answer "The U.S. unemployment rate in the last quarter of 2015 will decrease." The NLP Q&A system determines a LOC score of 6 for this portion of the translation, which falls in the first LOC range and electronically invokes a first disfluency methodology and a first set of disfluency constraints. The first disfluency methodology selects disfluent speech and/or disfluent text that are electronically associated with the first LOC range, and are generally understood by a reasonable hearer to communicate a moderately low level of confidence. The first disfluency methodology also provides electronic instructions for how the NLP Q&A system should integrate the selected disfluency speech or text into the NL output/answer. In the present example, the selected disfluent speech/text may be the disfluency "I think", and the first disfluent methodology may instruct the NLP Q&A system to insert the disfluency "I think" immediately after the word "decrease" in the NL output/answer. The first disfluency constraint may be that, if more than one disfluency is indicated for the relevant phrase or sentence, select different disfluencies for each instance. In the present example, the first disfluency constraint does not apply. Thus, the NLP Q&A system according to the present disclosure integrates the disfluency "I think" into the NL output/answer by placing it immediately after the word "decrease" in the NL output/answer. The initial NL output/answer generated by the NLP Q&A system would be modified from "The U.S. unemployment rate in the last quarter of 2015 will decrease" to "The U.S. unemployment rate in the last quarter of 2015 will decrease I think."

As with the NLT embodiments of the present disclosure, in one or more NLT Q&A embodiments, prosodic parameters may be added to the integration of disfluent speech or text to augment the disfluency. For example, a pause may be inserted immediately before the disfluency to add emphasis. In the above example, the NLP Q&A system in accordance with the present disclosure would generate a NL output/answer of "The U.S. unemployment rate in the last quarter of 2015 will decrease . . . I think," wherein " . . . " corresponds to a pause in speech.

The disclosed NLP system serves the needs of the speaker and the hearer. The hearer receives a NL communication of uncertainty using disfluencies optionally packaged with the prosodic variations that more accurately identify portion of the NL output about which the NLP system is uncertain. The speaker is also alerted to the uncertainty, so rather than relying on the hearer to diagnose the problem, the speaker can take remedial action, such as repeating the utterance in different, simpler words.

At least the features and combinations of features described in the immediately preceding paragraphs, including the corresponding features and combinations of features depicted in the figures, amount to significantly more than implementing a method of inserting disfluencies into speech or text using a particular technological environment. Additionally, at least the features and combinations of features described in the immediately preceding paragraphs, including the corresponding features and combinations of features depicted in the figures, go beyond what is well-understood, routine and conventional in the relevant field(s).

Cloud 50 may supplement, support or replace some or all of the functionality of the systems, methodologies and computer program products shown in FIGS. 4-9. Additionally, some or all of the functionality of the systems, methodologies and computer program products shown in FIGS. 4-9 may be implemented as a node 10 (shown in FIGS. 1 and 2) of cloud 50.

Figure 4:
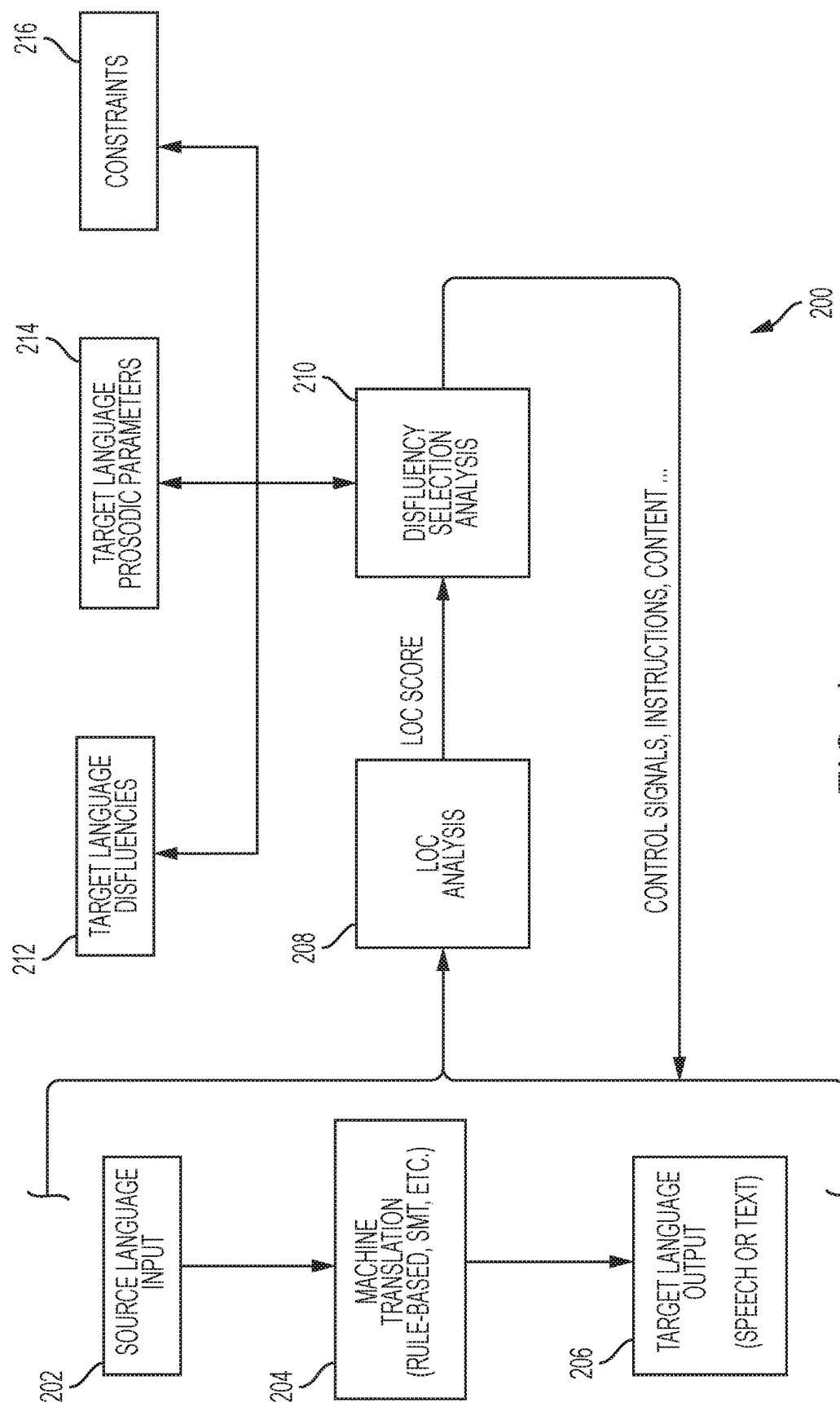
FIG. 4 depicts a system and methodology according to one or more embodiments.

Turning now to a more detailed description of the present disclosure, FIG. 4 depicts a NLT input/output module system 200 according to one or more embodiments. NLT system 200 includes a source language input circuit 202, a MT circuit 204, a target language output circuit 206, a LOC analysis circuit 208, a disfluency analysis circuit 210, a target language disfluency circuit 212, a target language prosodic parameter circuit 214 and a constraints circuit 216, configured and arranged as shown. The individual circuitry components of system 200 are illustrated separately for convenience. It is intended that the functionality of the various components of system 200 may be provided in a different arrangement of components and still fall within the scope of the teachings of the present disclosure. For example, the functionality of one or all of disfluency analysis circuit 210, target language disfluency circuit 212, target language prosodic parameter circuit 214 and constraints circuit 216 may be integrated with and provided in MT circuit 204. Additionally, some or all of the functionality of system 200 may be implemented as computer 10 shown in FIG. 1.

Source language input circuit 202 includes conventional circuitry and components that receive NL inputs as speech or text and generate electronic signals representing the speech or text, which are provided to MT circuit 204 for processing. Source language input circuit 202 may be implemented as an automatic speech recognition circuit. MT circuit 204 may be operated according to any known machine translation methodology, including, for example, rule-based machine translation methodologies, statistical machine translation methodologies, and the like. MT circuit 204 performs the actual machine translation from the source language to the target language and sends its output to target language output circuit 206 which converts the output of MT circuit 204 back to NL speech or text. Target language output circuit 206 may be implemented as a speech synthesizer, or as an equivalent system that converts the output of MT circuit 204 to NL text instead of NL speech.

LOC analyzer circuit 208 analyzes the operations performed by some or all of source language input circuit 202, MT circuit 204 and target language output circuit 206 to determine one or more LOC scores for an initial NL translation generated by either MT circuit 204 or target language output circuit 206. For a given translation, LOC scores may be generated at whatever level of granularity is desired (e.g., words, phrases, sentences, tokens, etc.). When LOC analyzer circuit 208 determines that a LOC score is above a predetermined triggering threshold (TH) value, it is determined that the confidence of system 200 is sufficiently high that the integration of disfluencies is not necessary, and the LOC sore is not sent to disfluency selection circuit 210. When LOC analyzer circuit 208 determines that a LOC score is below a predetermined triggering threshold (TH) value, it is determined that the confidence of system 200 is sufficiently low that the integration of disfluencies is necessary, and the LOC sore is sent to disfluency selection circuit 210.

LOC analyzer circuit 208, disfluency selection circuit 210, target language disfluency circuit 212, target language prosodic parameter circuit 214 and constraints circuit 216 cooperate to process LOC scores according to a methodology that results in disfluency selection circuit 210 outputting disfluency instructions and/or content that are used by MT circuit 204 and/or target language output circuit 206 to modify an initial NLT output to integrate therewith disfluency, or to, optionally, integrate both disfluency and prosodic parameters. The integrated disfluency (or the integrated disfluency+prosodic parameters) provides a NL communication to both the speaker and the user that there were uncertainties during natural language processing of the NL inputs to source language input circuit 202.

Disfluency analyzer circuit 210 stores data identifying multiple LOC ranges, which each represent a particular degree of uncertainty or confidence in the initial NL output electronically associated therewith. For example, LOC scores in a first LOC range can represent a moderately low level of confidence, LOC scores in a second LOC range can represent a low level of confidence, and LOC scores in a third LOC range can represent a very low level of confidence. Disfluency selection circuit 210 electronically associates (i.e., matches) LOC scores in the first LOC range with NL disfluent speech and text, which may be stored in lookup tables (not shown) of target language disfluency circuit 212. The NL disfluent speech and text in target language disfluency circuit 212 are generally understood by a reasonable hearer to communicate a moderately low level of confidence. Similarly, disfluency selection circuit 210 electronically associates LOC scores in the second LOC range with NL disfluent speech and text, which may also be stored in lookup tables (not shown) of target language disfluency circuit 212. The NL disfluent speech and text in target language disfluency circuit 212 are generally understood by a reasonable hearer to communicate a low level of confidence. Finally, disfluency selection circuit 210 electronically associates LOC scores in the third LOC range with NL disfluent speech and text, which may also be stored in lookup tables (not shown) of target language disfluency circuit 212. The NL disfluent speech and text in target language disfluency circuit 212 are generally understood by a reasonable hearer to communicate a low level of confidence.

Disfluency selection analysis circuit 210 also electronically associates the LOC ranges with various disfluency methodologies, which may be stored in disfluency selection analysis circuit 210. Each disfluency methodology controls the manner in which disfluency selection analysis circuit 210 selects the NL disfluent speech or text of target language disfluency circuit 212, as well as how the selected NL disfluent speech or text is integrated into the initial NL output generated by either MT circuit 204 or target language output circuit 206.

Disfluency selection analysis circuit 210 also electronically associates the LOC ranges with various disfluency constraints, which are stored in lookup tables (not shown) of constraints circuit 216. Each disfluency constraint prescribes one or more constraints on how the selected NL disfluent speech or text are integrated into the initial NL output generated by either MT circuit 204 or target language output circuit 206. Thus, a given LOC score that falls within the first LOC range is electronically associated with disfluent speech and/or disfluent text that are generally understood by a reasonable hearer to communicate a moderately low level of confidence. The LOC score in the first LOC range is also electronically associated with a first disfluency methodology and a first set of one or more disfluency constraints.

Disfluency selection analysis circuit 210 may optionally electronically associates the LOC ranges with various prosodic parameters, which are stored in lookup tables (not shown) of target language prosodic parameters circuit 214. Disfluency selection analysis circuit 210 may optionally add prosodic parameters of the target language the integration of disfluent speech or text in order to augment the disfluency. For example, a pause may be inserted immediately before the disfluency to add emphasis.

Figure 5:
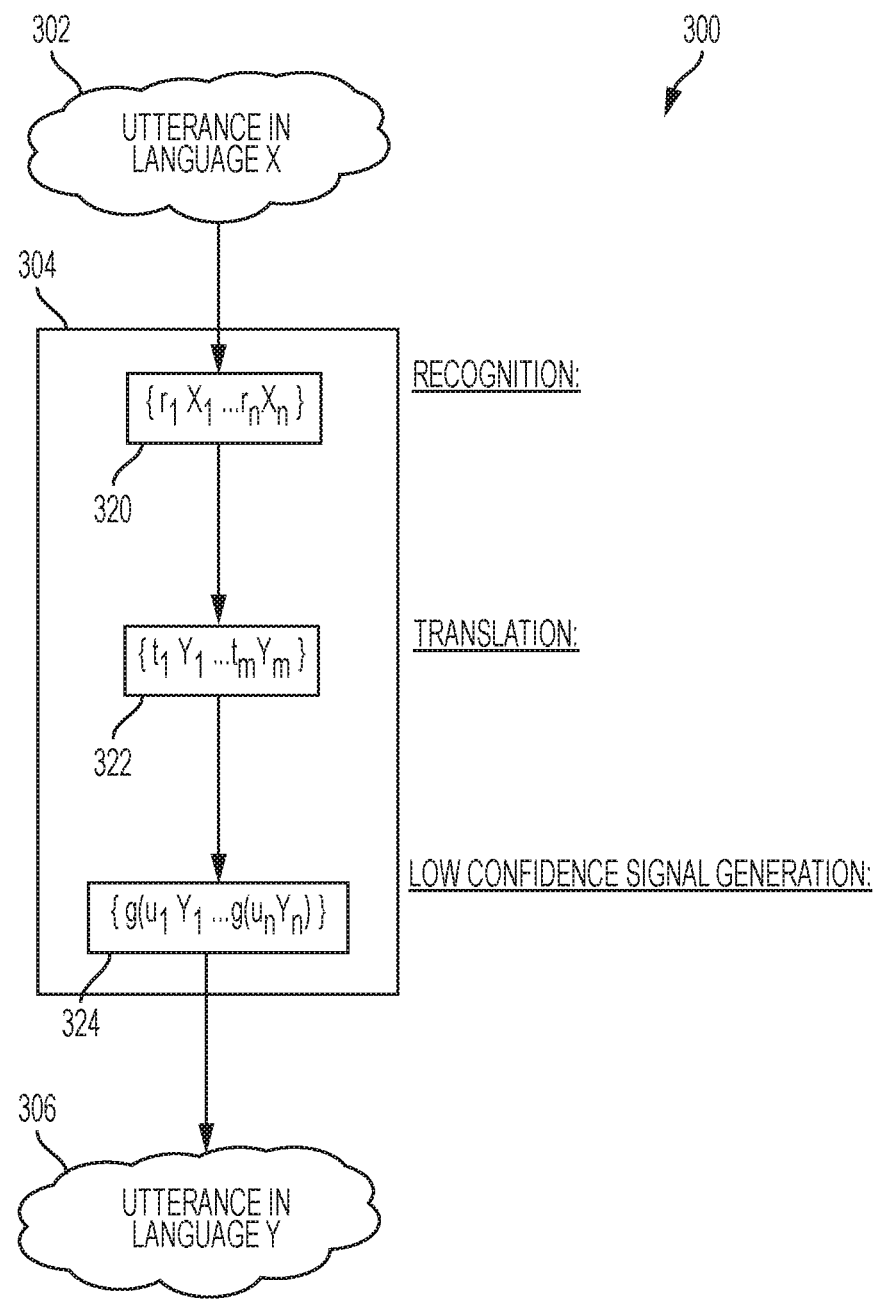
FIG. 5 depicts another system and methodology according to one or more embodiments.

FIG. 5 depicts another example of a NLT input/output module system 300 according to one or more embodiments. NLT system 300 includes a source language input circuit 302, a MT circuit 304 and a target language output circuit 306, configured and arranged as shown. Source language input circuit 302 may be implemented as an automatic speech/text recognition system, and target language output circuit 306 may be implements as a speech synthesizer circuit or an equivalent circuit that outputs text instead of speech. MT circuit 304 may be implemented according to a rule-based translation methodology or a statistical machine translation methodology.

In operation, source language input circuit 302 includes conventional circuitry and components that receive utterances in source language "X" as speech or text and generate electronic signals representing the speech or text, which are provided to MT circuit 304 for processing. MT circuit 304 performs the actual machine translation from the source language "X" to the target language "Y" and sends its output to target language output circuit 306, which converts the output of MT circuit 304 back to NL speech or text.

MT circuit 304 determines uncertainty associated with the translation of words or phrases from source language "X" to target language "Y," and generates low confidence signals to be embedded in the translation. Examples of "low confidence level signals," methods for applying the low confidence level signals, and constraints on the application of low confidence level signals are depicted in the table shown in FIG. 7. Referring still to FIG. 5, the operation of MT circuit 302 can be segmented into a recognition stage 320, a transition stage 322 and a low confidence signal generation stage 324. In recognition stage 320, input in language "X" is parsed into language tokens or phrases or sentences, which are shown as $X_i$. Each token or phrase or sentence is associated with its own recognition confidence, which are shown as ri. In translation stage 322, language tokens, phrases or sentences, $X_i$, are translated into language tokens, phrases or sentences, $Y_i$, wherein each language token, phrase or sentence is associated with its own translation confidence ti. In low confidence signal generation stage 324, a generation function, g, takes language token, phrase or sentence, $Y_i$, along with its uncertainty $u_i$ (which is the product of its recognition and translation confidences) and generates an output utterance in target language "Y."

Figure 6:
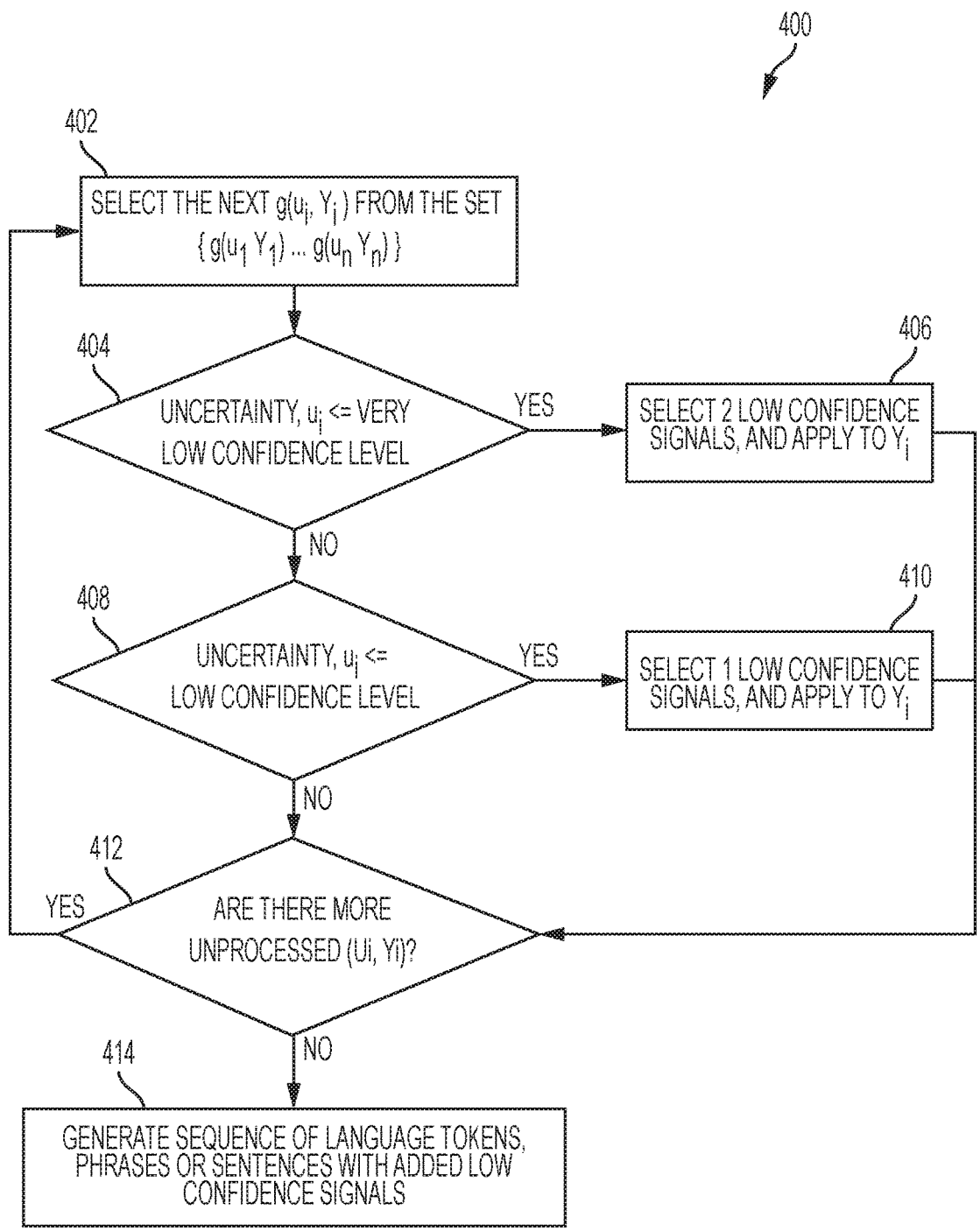
FIG. 6 depicts a diagram illustrating a methodology according to one or more embodiments.

FIG. 6 depicts a methodology 400 for embedding low confidence signals in translated outputs of NLT input/output module system 300 (shown in FIG. 5). Methodology 400 begins at block 402 by selecting a next $g(u_i, Y_i)$ from the set of $\{g(u_1, Y_1) \ldots g(u_n, Y_n)\}$. Decision block 404 then determines whether or not uncertainty, u is less than or equal to a "very" low confidence level. If the answer to the inquiry at decision block 404 is yes, methodology 400 moves to block 406, selects 2 low confidence signals and applies them to $Y_1$. Block 406 proceeds to decision block 412, which determines whether or not there are more unprocessed ($U_i$, $Y_i$). If the answer to the inquiry at decision block 412 is no, methodology 400 proceeds to block 414 and generates a sequence of language tokens, phrases or sentences with added low confidence signals. If the answer to the inquiry at decision block 412 is yes, methodology 400 returns to block 402 and selects a next $g(u_i, Y_i)$ from the set of $\{g(u_1, Y_1) \ldots g(u_n, Y_n)\}$.

Returning to decision block 404, if the answer to the inquiry at decision block 404 is no, methodology 400 moves to decision block 408 to determines whether or not uncertainty, $u_i$, is less than or equal to a "low" confidence level. If the answer to the inquiry at decision block 408 is yes, methodology 400 moves to block 410, selects 1 low confidence signals and applies it to $Y_i$. Block 410 proceeds to decision block 412, which determines whether or not there are more unprocessed ($U_i$, $Y_i$). If the answer to the inquiry at decision block 412 is no, methodology 400 proceeds to block 414 and generates a sequence of language tokens, phrases or sentences with added low confidence signals. If the answer to the inquiry at decision block 412 is yes, methodology 400 returns to block 402 and selects a next $g(u_i, Y_i)$ from the set of $\{g(u_1, Y_1) \ldots (g(u_n, Y_n)\}$.

Figure 8:
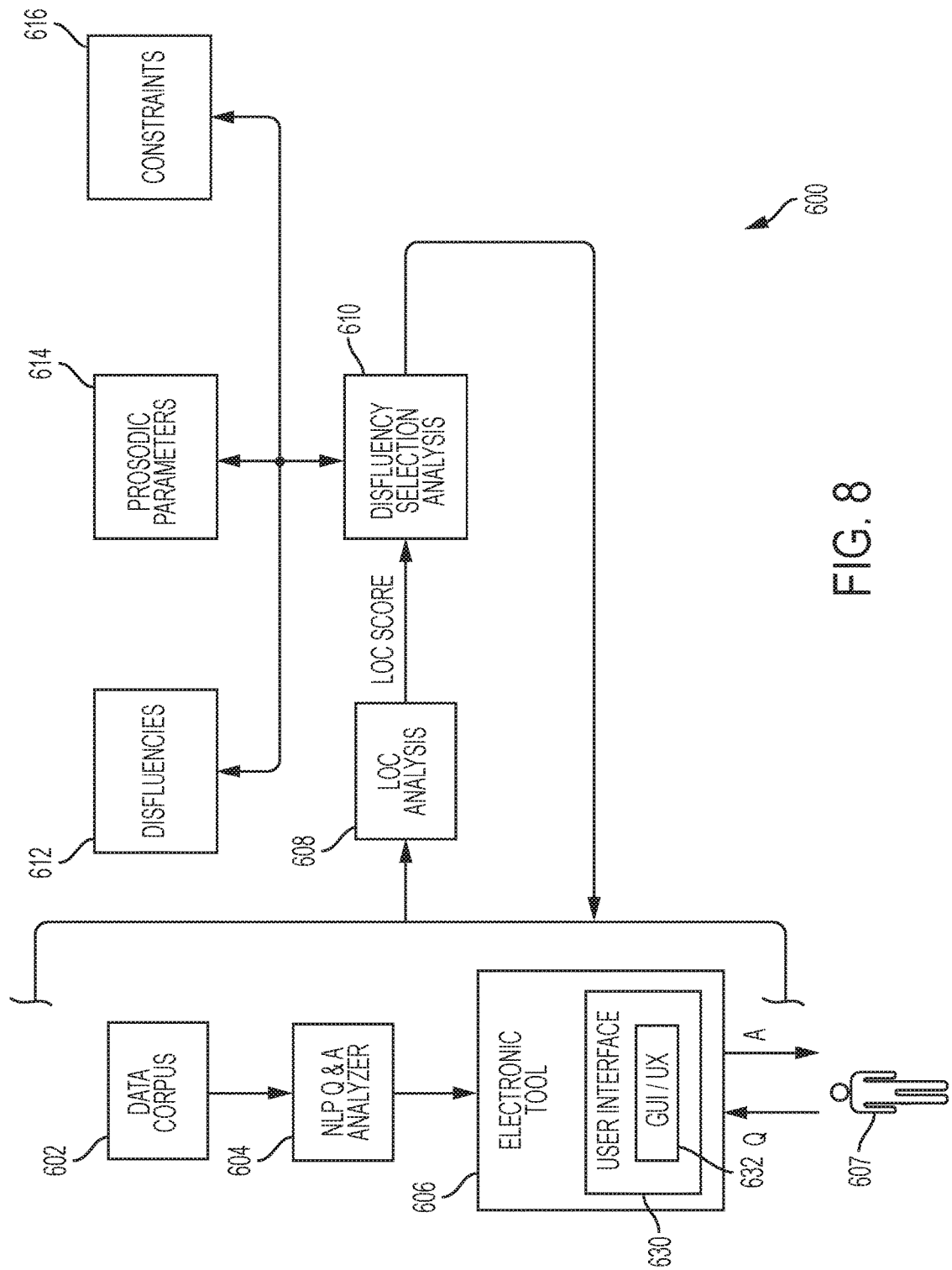
FIG. 8 depicts another system and methodology according to one or more embodiments.

FIG. 8 depicts an embodiment of the present disclosure applied to a NLP Q&A input/output module system 600. NLP Q&A system 600 answers NL questions by querying data repositories (e.g., data corpus circuit 602) and applying elements of language processing, information retrieval and machine learning (e.g., NLP Q&A analyzer circuit 604) to arrive at a conclusion. NLP Q&A system 600 assists humans with certain types of semantic query and search operations, such as the type of natural question-and-answer paradigm of a medical environment. An example NLP Q&A system is IBM's DeepQA technology as described in U.S. Pat. No. 8,275,803, issued Sep. 25, 2012, which is assigned to the assignee of the present disclosure, and which is incorporated by reference herein in its entirety. DeepQA systems and methodologies have been developed that are able to understand complex questions input to the system in natural language, and are able to answer the questions to augment human handling of the same questions within a given environment, such as a medical inquiry and diagnostic paradigm.

As shown in FIG. 8, NLP Q&A system 600 includes data corpus circuit 602, NLP Q&A analyzer circuit 604, an electronic tool 606 that interfaces with a user 607, a LOC analysis circuit 608, a disfluency analysis circuit 610, a disfluency circuit 612, a prosodic parameter circuit 614 and a constraints circuit 616, configured and arranged as shown. The individual circuit components of NLP Q&A system 600 are illustrated separately for convenience. It is intended that the functionality of the various components of system 600 may be provided in a different arrangement of components and still fall within the scope of the teachings of the present disclosure. For example, the functionality of one or all of disfluency analysis circuit 610, disfluency circuit 612, prosodic parameter circuit 614 and constraints circuit 616 may be integrated with and provided in NLP Q&A circuit 604. Additionally, some or all of the functionality of system 600 may be implemented as computer 10 shown in FIG. 1.

NLP Q&A system 600 answers NL questions presented by user 607 at electronic tool 606 by querying data repositories in data corpus circuit 602. NLP Q&A analyzer circuit 604 applies elements of language processing, information retrieval and machine learning to arrive at a conclusion. NLP Q&A system 600 assists humans with certain types of semantic query and search operations, such as the type of natural question-and-answer paradigm of a medical environment. The conclusions or answers are returned to user 607 using electronic tool 606, which can include all of the functionality of computer 10 (shown in FIG. 1).

Electronic tool 606 may further include functionality that allows it to receive or gather communications (e.g., questions) made by user/client 607 through user interface 630 and GUI/UX 632. For instance, electronic tool 606 may include a mobile device such as a smartphone, a smartwatch, a tablet computer, a laptop computer, etcetera, as well as stationary devices such as a desktop computer, a mainframe and the like. User interface 630 may include one or more microphones to receive audio communications made by user/client 607, along with one or more means of receiving textual communications from user/client 607, such as a virtual or physical keyboard or keypad. Electronic tool 606 may also convert any received audio communications into textual communications using one or more now known or later developed speech-to-text techniques. GUI/UX 632 provides a user experience (UX), which involves a person's behaviors, attitudes, and emotions about using a particular product, system or service. UX includes the practical, experiential, meaningful and valuable aspects of human computer interaction and product ownership. Additionally, UX includes a person's perceptions of system aspects such as utility, ease of use and efficiency. The amount of information that a user is required to enter into a system in order to have that system perform a particular task impacts UX.

LOC analyzer circuit 608 analyzes the operations performed by some or all of data corpus circuit 602, NLP Q&A analyzer circuit 604 and an electronic tool 606 that interfaces with a user 607 to determine one or more LOC score for an initial NL output/answer generated by NLP Q&A analyzer circuit 604. For a given output/answer, LOC scores may be generated at whatever level of granularity is desired (e.g., words, phrases, sentences, tokens, etc.). When LOC analyzer circuit 608 determines that a LOC score is above a predetermined triggering threshold (TH) value, it is determined that the confidence of system 600 is sufficiently high that the integration of disfluencies is not necessary, and the LOC sore is not sent to disfluency selection circuit 610. When LOC analyzer circuit 608 determines that a LOC score is below a predetermined triggering threshold (TH) value, it is determined that the confidence of system 600 is sufficiently low that the integration of disfluencies is necessary, and the LOC sore is sent to disfluency selection circuit 610.

LOC analyzer circuit 608, disfluency selection circuit 610, disfluency circuit 612, prosodic parameter circuit 614 and constraints circuit 616 cooperate to process LOC scores according to a methodology that results in disfluency selection circuit 610 outputting disfluency instructions and/or content that are used by NLP Q&A circuit 604 and/or electronic tool 606 to modify an initial NL output/answer to integrate therewith at least one disfluencies, or to, optionally, integrate at least one disfluencies and at least one prosodic parameters. The integrated disfluency (or the integrated disfluency+prosodic parameter) provides a NL communication to user 607 that there were uncertainties during generation of the NL output/answer.

Disfluency analyzer circuit 610 stores data identifying multiple LOC ranges, which each represent a particular degree of uncertainty or confidence in the initial NLP output/answer electronically associated therewith. For example, LOC scores in a first LOC range can represent a moderately low level of confidence, LOC scores in a second LOC range can represent a low level of confidence, and LOC scores in a third LOC range can represent a very low level of confidence. Disfluency selection circuit 610 electronically associates (i.e., matches) LOC scores in the first LOC range with NL disfluent speech and text, which may be stored in lookup tables (not shown) of disfluency circuit 612. The NL disfluent speech and text in disfluency circuit 612 are generally understood by a reasonable hearer to communicate a moderately low level of confidence. Similarly, disfluency selection circuit 610 electronically associates LOC scores in the second LOC range with NL disfluent speech and text, which may also be stored in lookup tables (not shown) of disfluency circuit 612. The NL disfluent speech and text in disfluency circuit 612 are generally understood by a reasonable hearer to communicate a low level of confidence. Finally, disfluency selection circuit 610 electronically associates LOC scores in the third LOC range with NL disfluent speech and text, which may also be stored in lookup tables (not shown) of disfluency circuit 612. The NL disfluent speech and text in disfluency circuit 612 are generally understood by a reasonable hearer to communicate a low level of confidence.

Disfluency selection analysis circuit 610 also electronically associates the LOC ranges with various disfluency methodologies, which may be stored in disfluency selection analysis circuit 610. Each disfluency methodology controls the manner in which disfluency selection analysis circuit 610 selects the NL disfluent speech or text of disfluency circuit 612, as well as how the selected NL disfluent speech or text is integrated into the initial NLP output/answer.

Disfluency selection analysis circuit 610 also electronically associates the LOC ranges with various disfluency constraints, which are stored in lookup tables (not shown) of constraints circuit 616. Each disfluency constraint prescribes one or more constraints on how the selected NL disfluent speech or text are integrated into the initial NLP output/answer. Thus, a given LOC score that falls within the first LOC range is electronically associated with disfluent speech and/or disfluent text that are generally understood by a reasonable hearer to communicate a moderately low level of confidence. The LOC score in the first LOC range is also electronically associated with a first disfluency methodology and a first set of one or more disfluency constraints.

Disfluency selection analysis circuit 610 may optionally electronically associates the LOC ranges with various prosodic parameters, which are stored in lookup tables (not shown) of prosodic parameters circuit 614. Disfluency selection analysis circuit 610 may optionally add prosodic parameters of the integration of disfluent speech or text in order to augment the disfluency. For example, a pause may be inserted immediately before the disfluency to add emphasis.

Thus it can be seen from the forgoing detailed description that one or more embodiments of the present disclosure provide technical benefits and advantages. Specifically, one or more embodiments provide systems and methods for alerting speakers and hearers that NLP outputs may contain errors by inserting natural disfluencies and other cues in the NLP output. The disclosure makes use of the ability of a NLP system to recognize when a significant probability of an error exists by estimating how confident the system is that some or all of its NLP output is correct. Based on an analysis of confidence scores generated by the system, the present disclosure selects and embeds disfluencies and other cues to into the NLP output itself in a way that is natural and intuitive. The embedding can be accomplished in a number of ways, including inserting non-lexical utterances like "um" and "er" before a low confidence word or phrase or sentence, inserting a pause before the non-lexical phrase or utterance, adding an expression or gesture indicating uncertainty just before or during the production of the low confidence word or phrase or sentence (e.g., where the NLP system uses a robot or virtual avatar in producing its NLP output), adding a rising intonation to the concluding phonemes of an embedded disfluency, adding an expression or gesture indicating uncertainty just before or during the production of a disfluency (e.g., where the NLP system uses a robot or virtual avatar in producing its NLP output), or inserting a linguistic hedge (e.g., "I think that's right") following a low confidence NLP output.

To maintain the naturalness of the generated NL speech or text, parameters can be defined to keep the occurrence of the low confidence signals within their norms. For example, pauses could be limited a maximum of 1.5 seconds, and the number of inserted non-lexical utterances to two. Naturalness can also be increased by alternating methods used to signal low confidence items over the course of the dialog. Thus, "uh" may be used to signal one instance of low confidence, and "er" used the next time, and a 500 ms pause insert before the disfluency the third time. It is also the case that low confidence signals and their associated disfluencies and/or prosodic parameters may vary according to linguistic and regional factors. For instance, the length of natural pauses in speech is shorter in the eastern regions of the USA than the in the midwestern regions of the USA. Similarly, different non-lexical utterances may be preferred in different regions.

Figure 9:
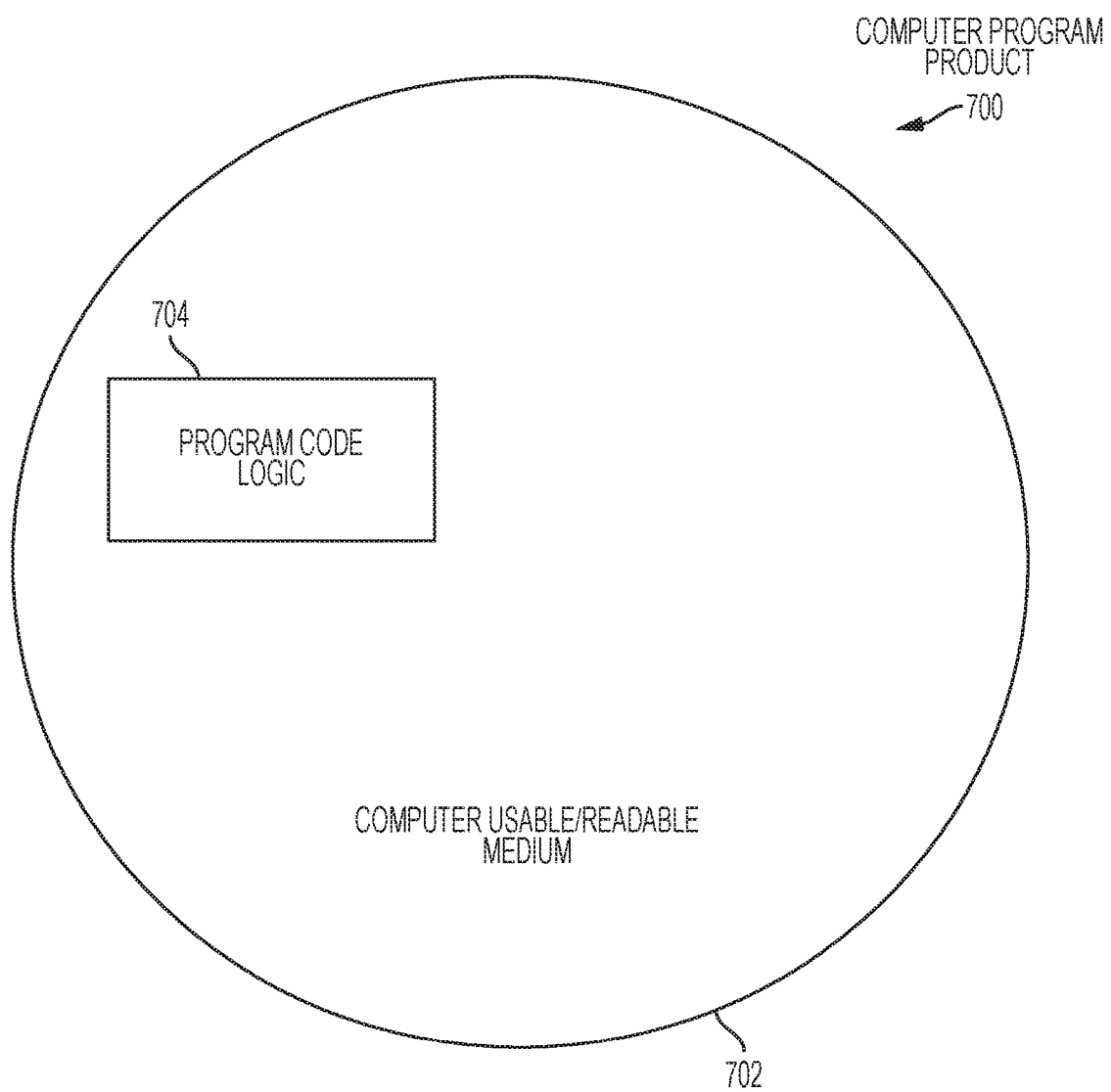
FIG. 9 depicts a diagram of a computer program product according to one or more embodiments.

Referring now to FIG. 9, a computer program product 700 in accordance with an embodiment that includes a computer readable storage medium 702 and program instructions 704 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of operating a speech synthesizer (SS) circuit configured to convert natural language inputs to natural language outputs and provide a natural language alert that communicates that the natural language outputs may contain error, the computer-implemented method comprising:
    converting, using a machine translation circuit of the SS circuit, a natural language input to natural language input data, wherein the natural language input comprises a human source language;
    performing, using the machine translation circuit of the SS circuit, a translation operation on the natural language input data to translate the natural language input data to a natural language output that represents a target human language;
    wherein the translation operation comprises performing a confidence level analysis on at least one portion of the translation operation to generate at least one confidence level signal that represents a confidence level that the natural language output that results from the translation operation contains error;
    wherein the translation operation further comprises, based at least in part on the at least one confidence level that the natural language output contains an error, selecting a portion of a disfluency natural language data stored in a memory and embedding the selected portion of the disfluency natural language data into the natural language output;
    wherein the selected portion of the disfluency natural language data is embedded into the natural language output in a location selected to communicate that a portion of the natural language output may contain an error; and
    converting, using the SS circuit, the natural language output that has been embedded with the selected portion of the disfluency natural language data into speech or text comprising a natural language output having disfluency, wherein the natural language output is in the target human language and the disfluency is in the target human language.

2. The computer-implemented method of claim 1 further comprising:
    based at least in part on the confidence level, integrate at least one prosodic parameter into the natural language output data.

3. The computer-implemented method of claim 1, wherein the disfluency comprises a non-lexical utterance, which is derived from the target human language and communicates a degree of confidence.

4. The computer-implemented method of claim 1, wherein the speech comprises a linguistic utterance in the target human language that communicates a degree of confidence.

5. The computer-implemented method of claim 1, wherein:
    the translation operation comprises applying first constraints on how the selected portion of the disfluency natural language data is embedded into the natural language output data; and
    the translation operation further comprises applying second constraints on how the selected portion of the disfluency natural language data is integrated into the natural language output data.

6. The computer-implemented method of claim 5, wherein:
the first constraints comprise varying how the translation operation is performed; and
the second constraints comprise varying how the translation operation is performed.

7. A computer-implemented method of operating a speech synthesis (SS) system configured to convert natural language inputs to natural language outputs and provide a natural language alert that communicates that the natural language outputs may contain error, the computer-implemented method comprising:
receiving, at an input/output module of the SS processor, a natural language input comprising a natural language question;
converting, using the input/output module, the natural language input to natural language input data;
performing, using a processor of the SS system, an analysis operation on data of a corpus to generate natural language output data that represents a natural language answer to the natural language question;
wherein the analysis operation comprises performing a confidence level analysis on at least one portion of the analysis operation to generate at least one confidence level signal that represents a confidence level that the natural language output data that results from the analysis operation contains error;
wherein the analysis operation further comprises, based at least in part on the at least one confidence level that the natural language output contains an error, selecting a portion of a disfluency natural language data stored in a memory and embedding the selected portion of the disfluency natural language data into the natural language output;
wherein the selected portion of the disfluency natural language data is embedded into the natural language output in a location selected to communicate that a portion of the natural language output may contain an error; and
converting, using a speech synthesizer (SS) circuit of the natural language processor, the natural language output data that has been embedded with the selected portion of the disfluency natural language data into speech or text that comprises a natural language answer with a natural language disfluency.

8. The computer-implemented method of claim 7, wherein:
the disfluency comprises a non-lexical or a linguistic utterance that communicates a degree of confidence.

9. The computer-implemented method of claim 7, wherein:
the analysis operation comprises applying first constraints on how the selected portion of the disfluency natural language data is embedded into the natural language output data; and
the analysis operation comprises applying second constraints on how the selected portion of the disfluency natural language data is embedded into the natural language output data.

10. The computer-implemented method of claim 9, wherein:
the first constraints comprise varying how the analysis operation is performed; and
the second constraints comprise varying how the analysis operation is performed.

\* \* \* \* \*